Dec. 16, 1941.  A. F. BAILLIO  2,266,299
AIR CLEANER AND SILENCER ASSEMBLY
Original Filed Aug. 10, 1938
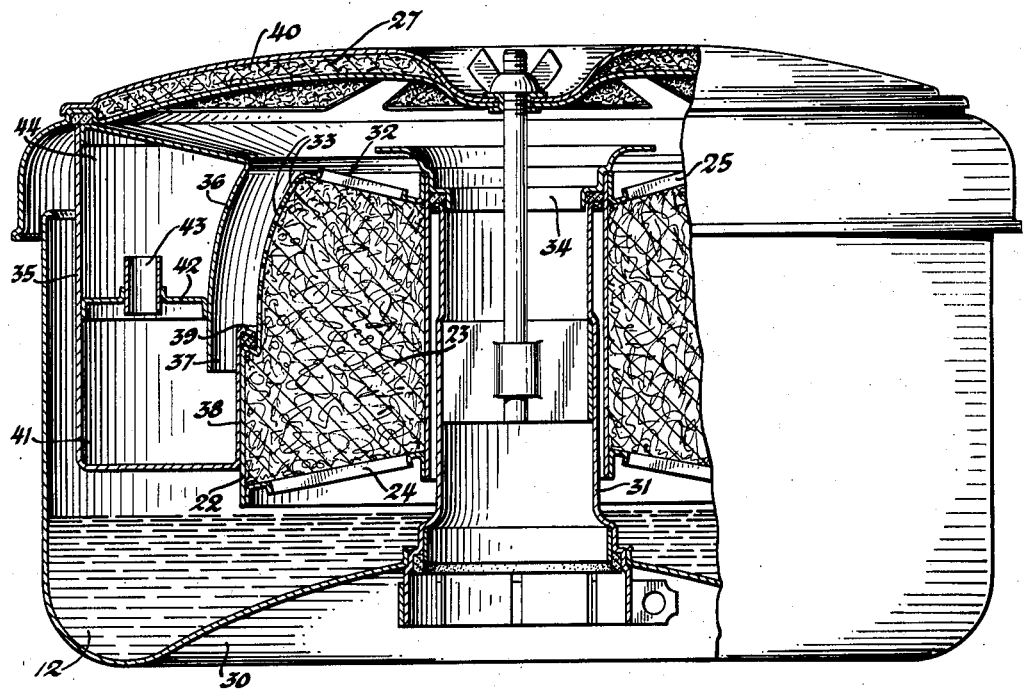
Inventor
Alexander F. Baillio
By Blackmore, Sweeney & Flint
Attorneys Patented Dec. 16, 1941

2,266,299

UNITED STATES PATENT OFFICE 2,266,299

AIR CLEANER AND SILENCER ASSEMBLY

Alexander F. Baillio, Detroit, Mich., assignor to General Motors Corporation, Detroit, Mich., a corporation of Delaware Original application August 10, 1938, Serial No. 224,145. Divided and this application October 3, 1940, Serial No. 359,490

2 Claims. (Cl. 183—15)

This invention has for its principal object to provide an air cleaner and silencer assembly in which the elements are so constructed and arranged as to minimize the height of the assembly and to make it in all respects as compact as possible.

The invention is primarily concerned with assemblies of liquid bath air cleaners and resonator silencers and resides in an assembly of such an air cleaner and such a silencer in which, to the end mentioned above, the silencer is arranged so that it encircles the filter of the air cleaner.

For a better understanding of the nature and objects of this invention, reference is made to the following specification wherein is described the preferred embodiment of the invention which is illustrated in the accompanying drawing.

In the accompanying drawing, the single figure is a view, mainly in vertical section, of a liquid bath air cleaner and resonator silencer assembly in accordance with this invention.

The assembly shown in the drawing includes a member 30 which is shaped generally like a shallow circular bowl and has an orifice in the center of its bottom in which there is secured a tube 31 which extends into the bowl-like member 30 to about the level of the upper edge of its side wall. The tube 31, through which air leaves the assembly, defines with the bowl-like member 30 an annular reservoir which is filled to about the level indicated in the drawing with oil or some other suitable liquid 12 before the assembly is put into use. The tube 31 is encircled by an annular filter 32 which consists of an annular shell 22 filled with a suitable air filtering medium 23 which is wetted with the liquid 12. The inner wall of the annular shell 22 is imperforate but there are in its lower wall air inlet orifices 24 and in its upper wall air outlet orifices 25 from which air passes toward the upper end of the tube 31. The outer wall of the annular shell 22 is offset inwardly about midway between its upper and lower ends. The portion below the offset is imperforate but the portion above the offset is curved inwardly and upwardly and riddled with perforations 33. The filter 32 is supported with its lower wall above the liquid level in the annular reservoir by an annular element 34 which is secured to its inner wall and seated on the upper end of the tube 31.

Between the filter and the side wall of the bowl-like member 30 there is disposed an annular shell 35 whose upper and lower and outer walls are imperforate. The inner wall of the annular shell 35, however, consists of a member 36 which depends from the inner edge of the upper wall of the annular shell and whose upper part follows closely the contour of but is spaced from the upper portion of the outer wall of the filter to define an aperture 37 and a member 38 which projects upwardly from the inner edge of the lower wall of the annular shell and fits snugly around the lower portion of the outer wall of the filter and overlaps but is spaced outwardly from the lower edge of the member 36 by a continuation of the aperture 37. The annular shell 35 is supported from the filter 32 with its outer side wall spaced from the side wall of the bowl-like member 30 and its lower wall spaced above the liquid level in the annular reservoir to define a passage through which and the space between the lower wall of the filter and the liquid level in the annular reservoir air passes from the atmosphere into the air inlet orifices in the lower wall of the filter by a lip 39 on the member 38 which is seated on the step in the outer wall of the filter.

On the outer edge of the annular shell 35 there is seated a cover 40 which is lined with a sound absorbent 27 and closes the upper end of the aperture 37, the air outlet orifices 25 in the upper wall of the filter and the upper end of the tube 31 to the atmosphere but is spaced from them so that air can pass from the air outlet orifices in the upper wall of the filter into the upper end of the tube and the aperture 37 communicates with this passage. The interior of the annular shell 35 which communicates, besides as I have intimated with the passage between the air outlet orifices 25 in the upper wall of the filter and the upper end of the tube 31 through the aperture 37, with the interior of the filter through the aperture 37 and the perforations 33 is subdivided into two chambers 41 and 44 by a partition 42 through which extends a tube 43 which establishes communication between the chambers. The chambers 41 and 44 and the tube 43 and the aperture 37 and the perforations 33, of course, constitute a compound resonator.

The assembly shown in the drawing was designed for use on an internal combustion engine carburetor with the lower end of the tube 31 connected to the air intake tube of the carburetor. The path of travel of air through the assembly has been indicated in the foregoing description and since individually the air cleaner and silencer included in the assemblies are of well known types further description of the mode of operation of the assembly appears unnecessary—it being understood, of course, that the resonator 41-43-44-37-33 is to be so tuned that it will respond to and attenuate by resonance preselected objectionable sound waves in the intake noise of the engine on which the assembly is installed. It will, of course, be understood that it is not necessary to locate the outer "neck" of the resonator included in the assembly in the wall in which it is shown. For example, the outer "neck" may be located in the outer instead of the inner wall of the resonator. With the outer neck in either location, the assembly may, of course, be used with an outlet duct which opens into it through its cover instead of through its bottom.

This application is a division of my application Serial No. 224,145, filed August 10, 1938, which has matured into Patent No. 2,217,830, dated October 15, 1940.

I claim:

1. In an appliance of the type disclosed, a bowl-like member, a tube through which air leaves the appliance secured in an orifice in the bottom of the bowl-like member and defining with it an annular liquid reservoir, an annular filter with air inlet and outlet orifices in its lower and upper walls disposed within the bowl-like member and encircling the tube with its lower wall spaced from the bottom of the bowl-like member, an annular shell which defines a sound wave attenuating compartment disposed within the bowl-like member and encircling and communicating as a side branch with the filter with its outer side and lower walls spaced from the side wall and bottom of the bowl-like member to define a passage through which and the space between the lower wall of the filter and the bottom of the bowl-like member air travels from the atmosphere to the air inlet orifices in the lower wall of the filter, and a cover which closes the air outlet orifices in the upper wall of the filter and the upper end of the tube to the atmosphere but does not prevent air traveling from the former into the latter.

2. In an appliance of the class disclosed, a bowl-like member which constitutes a liquid reservoir, a filter with air inlet and outlet orifices in its lower and upper walls disposed within the bowl-like member with its lower wall spaced from the bottom of the bowl-like member, an annular shell disposed within the bowl-like member and encircling the filter with its outer side and lower walls spaced from the side wall and bottom of the bowl-like member to define a passage through which and the space between the lower wall of the filter and the bottom of the bowl-like member air travels from the atmosphere to the air inlet orifices in the lower wall of the filter, a tube through which air leaves the appliance, and a cover which closes the air outlet orifices in the upper wall of the filter to the atmosphere and constitutes a wall of a passage through which air travels from the air outlet orifices in the upper wall of the filter into the tube, the annular shell defining a sound wave attenuating compartment which communicates as a side branch with the passage through which air travels through the appliance.

ALEXANDER F. BAILLIO.